J. M. ANDERSON.
MACHINE FOR CATCHING INSECTS.
APPLICATION FILED APR. 2, 1909.

944,122.

Patented Dec. 21, 1909.
2 SHEETS—SHEET 1.

Witnesses
Theo. Rosemand
J. S. Austin

Inventor
John M. Anderson

By
Joshua R. H. Potts
Attorney

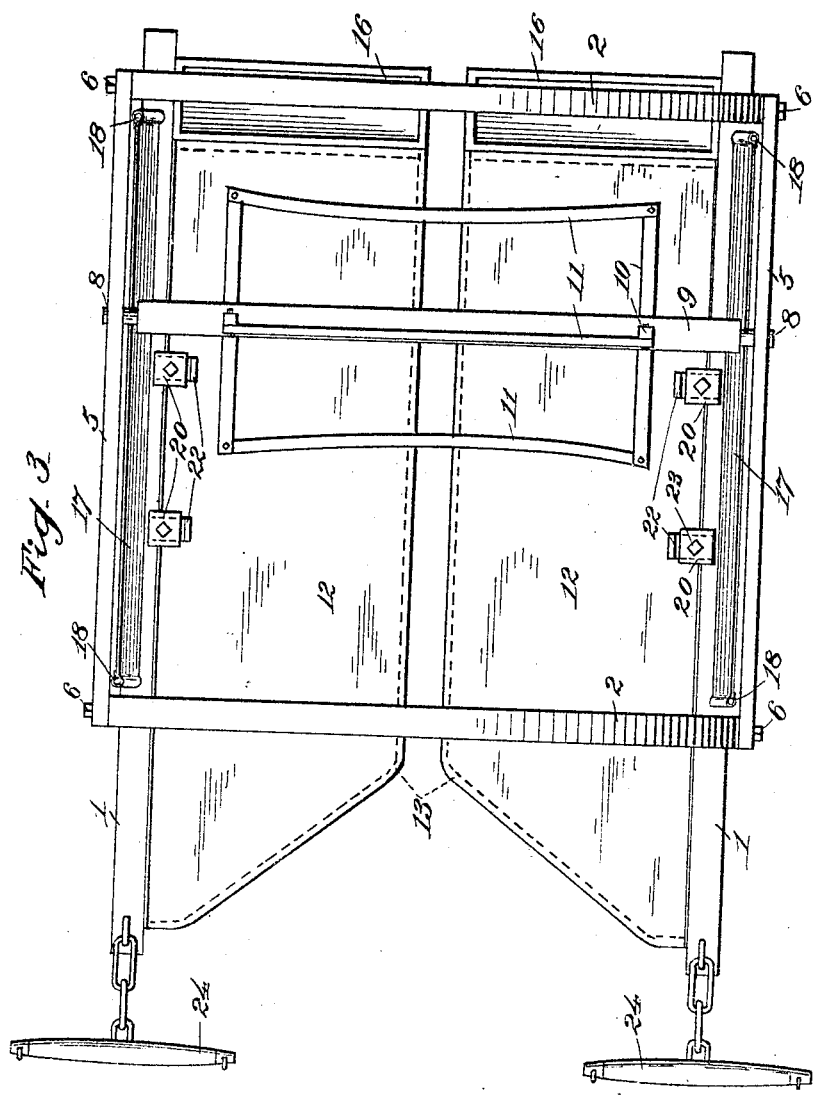

UNITED STATES PATENT OFFICE.

JOHN M. ANDERSON, OF FRANKLIN COUNTY, TEXAS.

MACHINE FOR CATCHING INSECTS.

944,122.  Specification of Letters Patent.  Patented Dec. 21, 1909.

Application filed April 2, 1909.  Serial No. 487,547.

*To all whom it may concern:*

Be it known that I, JOHN M. ANDERSON, a citizen of the United States, residing in the county of Franklin and State of Texas, have invented certain new and useful Improvements in Machines for Catching Insects, of which the following is a specification.

My invention relates to an improved machine for catching insects, and more particularly designed for knocking the well known boll weevil from cotton plants, and also knocking the injured bolls from the cotton plants, the object of the invention being to provide an extremely simple construction of machine, which can be readily drawn along the ground, straddling the rows of cotton, and which will effectually knock and shake the boll weevils from the plants, and also the injured bolls, and collect them in boxes carried by the machine for the purpose.

A further object is to provide improvements of this character, which are capable of a wide range of adjustments in accordance with the size of the plants to be operated upon, and strong and durable in use.

With these and other objects in view, the invention consists in certain novel features of construction, and combinations, and arrangements of parts as will be more fully hereinafter described and pointed out in the claims.

Figure 1:
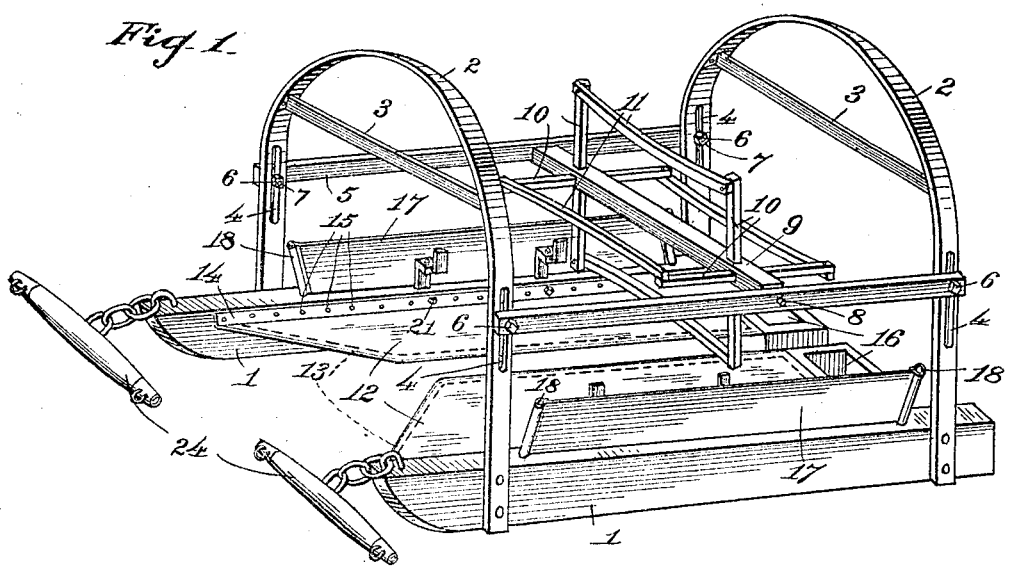
Figure 2:
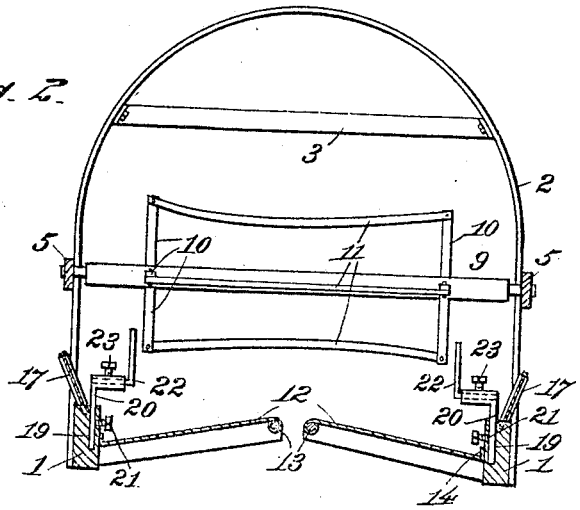

In the accompanying drawings, Figure 1, is a perspective view illustrating my improvements. Fig. 2, is a top plan view, and Fig. 3, is a view in cross section.

1, 1, represent parallel runners, connected by curved or arched bars 2, the latter having transverse braces 3 to strengthen them and prevent lateral movement of the runners, relative to each other. The bars 2, at opposite sides are provided with elongated slots 4, and longitudinal bars 5 are secured by clamping bolts 6, passing through openings in the ends of the bars 5, and through the slots 4, and secured by nuts 7, thus permitting vertical adjustment of the bars for a purpose which will hereinafter appear. These bars 5 are made with alined openings constituting bearings for the journals 8 of a reel 9. This reel 9 may be made in various ways, but a preferable way is to provide cross bars 10 connected by curved blades 11 as clearly shown.

Canvas or duck platforms 12 are secured to the inner faces of the runners 1, and are held taut by means of wire frames 13, located within the seams of the canvas or duck, and the latter is secured to the inner face of the runners by means of longitudinal strips 14 secured by screws or other fastening devices 15, as clearly shown in Fig. 3. These canvas or duck platforms are spaced apart at their center or inner edges far enough to accommodate the stalk of a cotton plant, and inclined downwardly from their inner to their outer edges. These canvas or duck platforms extend rearward to boxes or receptacles 16, secured to the runners, and into which insects and trash knocked from the plants will be guided and collected. Canvas or duck shields or walls 17, having posts 18 at their ends, are removably secured to the upper edges of the runners, so as to catch any insects or trash, which might otherwise be deflected to the sides of the machine, and direct the same onto the platforms 12.

The runners 1 are made with recesses 19, into which brackets 20 are disposed, and secured at any vertical adjustment therein by means of set screws 21. The upper ends of these brackets are made in the form of horizontal sleeves to receive L-shaped arms 22, adjustable laterally in the brackets, and secured at various adjustments within the brackets by means of set screws 23. These arms are so positioned, that they will strike the lower limbs of the cotton plants and shake the boll weevils and the injured bolls from such limbs, while the reel will engage the upper portions of the plant and knock the boll weevils and the injured bolls from the upper portion of the plant.

The machine may be drawn along the ground in any desired manner. I have illustrated for the purpose swingletrees 24 connected with each runner, but it is obvious that various other ways might be employed for moving the machine over the ground. It is of course, to be understood, that the reel will be revolved as the machine moves over the ground, and this revolving may be done in very many different ways, and as it revolves, it will shake the plant, and together with the arms 25, the plants will be thoroughly shaken, so that the boll weevils and the injured bolls will be knocked from the plants and fall onto the platforms 12, and as they accumulate on the latter, they will gradually move rearward in the boxes or receptacles 16 provided for their reception.

Slight changes might be made in the general form and arrangements of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a machine of the character described, the combination with runners, of flexible platforms secured to the inner faces of said runners, wire frames strengthening said platforms and holding them in position, said platforms spaced apart and inclining downwardly from their inner to their outer edges, and means on said runners for agitating a plant, whereby insects and trash may be knocked on to said platforms.

2. In a machine of the character described, the combination with runners, of flexible platforms secured to the inner faces of said runners, wire frames strengthening said platforms and holding them in position, said platforms spaced apart and inclining downwardly from their inner to their outer edges, and means on said runners for agitating a plant, whereby insects and trash may be knocked onto said platforms, and receptacles carried by said runners at the rear of said platforms and into which said insects and trash are adapted to collect.

In testimony whereof I have signed my name to this specification in the presence of two subscribing witnesses.

JOHN M. ANDERSON.

Witnesses:
  CRAYTON BRADLEY,
  A. A. BANKS.